(12) United States Patent
Roffet et al.

(10) Patent No.: US 10,229,484 B2
(45) Date of Patent: Mar. 12, 2019

(54) TONE MAPPING METHOD

(71) Applicant: STMicroelectronics (Grenoble 2) SAS, Grenoble (FR)

(72) Inventors: Grégory Roffet, Coublevie (FR); Mathieu Thivin, Voreppe (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 132 days.

(21) Appl. No.: 15/365,086

(22) Filed: Nov. 30, 2016

(65) Prior Publication Data
US 2018/0150946 A1 May 31, 2018

(51) Int. Cl.
| G06T 5/00 | (2006.01) |
| H04N 9/68 | (2006.01) |
| G06T 7/40 | (2017.01) |
| G06T 5/40 | (2006.01) |
| H04N 5/232 | (2006.01) |
| H04N 9/04 | (2006.01) |

(52) U.S. Cl.
CPC ............... G06T 5/009 (2013.01); G06T 5/40 (2013.01); G06T 7/408 (2013.01); H04N 5/23229 (2013.01); H04N 9/045 (2013.01); H04N 9/68 (2013.01); G06T 2207/10024 (2013.01); G06T 2207/20072 (2013.01); G06T 2207/20208 (2013.01)

(58) Field of Classification Search
None
See application file for complete search history.

(56) References Cited

U.S. PATENT DOCUMENTS

| 5,440,341 A * | 8/1995 | Suzuki ................ H04N 9/045 348/256 |
| 6,052,740 A | 4/2000 | Frederick |
| 2005/0117799 A1 | 6/2005 | Fuh et al. |
| 2006/0187232 A1* | 8/2006 | Kempf .................. G09G 5/04 345/591 |
| 2006/0188153 A1* | 8/2006 | Kempf .................. H04N 9/68 382/167 |

(Continued)

FOREIGN PATENT DOCUMENTS

| JP | S62189874 A | 8/1987 |
| JP | 2011182233 A | 9/2011 |
| WO | 2012/118961 A1 | 9/2012 |

OTHER PUBLICATIONS

Duan, J., et al., "Tone-mapping high dynamic range images by novel histogram adjustment," Pattern Recognition 43 (2010) pp. 1847-1862.

(Continued)

Primary Examiner — Bernard Krasnic
(74) Attorney, Agent, or Firm — Seed IP Law Group LLP

(57) ABSTRACT

Tone mapping is applied to pixels of a digital image. A luminance value of a pixel is determined based on whether one or more pixel intensity values of a pixel in a color space are within a pixel saturation range. A pixel gain is determined based on the determined luminance value of the pixel, and the determined pixel gain is applied to the pixel. The luminance value may also or instead be determined based on whether one or more of the pixel intensity values is within a pixel black-out range. A weight may be employed to determine the luminance value.

17 Claims, 2 Drawing Sheets

(56) References Cited

U.S. PATENT DOCUMENTS

| | | |
|---|---|---|
| 2007/0195384 A1 | 8/2007 | Lee et al. |
| 2007/0291336 A1* | 12/2007 | Hsu ................... H04N 1/6027 358/520 |
| 2008/0049275 A1* | 2/2008 | Hsu ..................... H04N 1/608 358/520 |
| 2009/0317017 A1 | 12/2009 | Au et al. |
| 2010/0157078 A1 | 6/2010 | Atanassov et al. |
| 2010/0225673 A1 | 9/2010 | Miller et al. |
| 2010/0278423 A1 | 11/2010 | Itoh et al. |
| 2013/0222414 A1 | 8/2013 | Ito et al. |
| 2013/0321679 A1 | 12/2013 | Lim et al. |
| 2014/0152694 A1* | 6/2014 | Narasimha ............ G09G 5/377 345/629 |
| 2014/0267822 A1 | 9/2014 | Roffet |

OTHER PUBLICATIONS

Duan, J., et al., "Fast Tone Mapping for High Dynamic Range Images," ICPR '04 Proceedings of the Pattern Recognition, 17th International Conference, vol. 2, pp. 847-850.

* cited by examiner

TONE MAPPING METHOD

BACKGROUND

Technical Field

The present disclosure generally relates to the processing of digital images, including tone mapping.

Description of the Related Art

In tone mapping, a group of digital image processing techniques are used, for example, to generate, from a high dynamic range image where a large number of different tones (or degrees of intensity) are available to depict a scene, an image of lower dynamic range where a smaller number of tones is available to depict the scene.

Tone mapping techniques may be used in combination with methods for obtaining high dynamic range images where several images of a same scene are successively acquired with different sensor integration times, after which these images are merged into a high dynamic range image where the values of the pixels corresponding to the darkest areas of the scene are based on the values of the corresponding pixels of the images acquired with the highest integration times, and the values of the pixels corresponding to the brightest areas of the scene are based on the values of the corresponding pixels of the images acquired with the shortest integration times. The high dynamic range image may be coded over a relatively large number of bits. To make this image compatible with equipment having but a limited number of tones to depict a scene (for example, a display device), it may be provided to use tone mapping techniques to decrease the dynamic range of the image while keeping the appearance of a high dynamic range image.

Tone mapping techniques may also be used to modify the tone distribution in an image without decreasing its dynamic range, for example, to apply special effects, a gamma function, etc.

BRIEF SUMMARY

In an embodiment, a method comprises: determining, using image processing circuitry, whether one or more pixel intensity values of a pixel in a color space are within a pixel saturation range; setting a luminance value of the pixel based on the determination of whether one or more pixel intensity values of the pixel are within the pixel saturation range; determining, using the image processing circuitry, a pixel gain based on the set luminance value of the pixel; and applying, using the image processing circuitry, the determined pixel gain to the pixel. In an embodiment, the pixel is one of a plurality of pixels of an input digital image, and the method comprises: generating, using the image processing circuitry, an output digital image based on the input digital image, the generating the output digital image including determining and applying respective gains to the plurality of pixels of the input digital image. In an embodiment, luminance values of pixels of the output digital image are coded over a smaller number of bits than luminance values of pixels of the input digital image. In an embodiment, when at least one of the one or more pixel intensity values is within the pixel saturation range, the setting the luminance value of the pixel is based on at least one of: a pixel saturation intensity value; and the at least one of the one or more pixel intensity values. In an embodiment, the setting the luminance value of the pixel based on the pixel saturation intensity value comprises applying a weight to the pixel saturation intensity value. In an embodiment, the method comprises determining the weight based on a difference between the at least one of the one or more pixel intensity values and the pixel saturation intensity value. In an embodiment, the method comprises setting the luminance value of the pixel to a weighted combination of the one or more pixel intensity values of the pixel when it is determined that the pixel intensity values of the pixel are outside the pixel saturation range. In an embodiment, the method comprises: when it is determined that the pixel intensity values of the pixel are outside the pixel saturation range, determining whether one or more pixel intensity values of the pixel are within a pixel black-out range; and setting the luminance value of the pixel based on the determination of whether one or more pixel intensity values of the pixel are within the pixel black-out range. In an embodiment, when it is determined that one or more of the pixel intensity values are within the pixel black-out range, the setting the luminance value of the pixel comprises applying a weight to a black-out intensity value. In an embodiment, the method comprises, when it is determined that the pixel intensity values of the pixel are outside the pixel saturation range and outside the pixel black-out range, setting the luminance value of the pixel to a weighted combination of the one or more pixel intensity values of the pixel. In an embodiment, the pixel is a macro-pixel and the determined gain is applied to all of the pixels of the macro-pixel. In an embodiment, the color space is a Bayer color space.

In an embodiment, a device comprises: a memory; and image processing circuitry, which, in operation: determines whether one or more pixel intensity values of a pixel in a color space are within a pixel saturation range; sets a luminance value of the pixel based on the determination of whether one or more pixel intensity values of the pixel are within the pixel saturation range; determines a pixel gain based on the set luminance value of the pixel; and applies the determined pixel gain to the pixel. In an embodiment, the pixel is one of a plurality of pixels of an input digital image, and the image processing circuitry, in operation, generates an output digital image based on the input digital image, the generating the output digital image including determining and applying respective gains to the plurality of pixels of the input digital image. In an embodiment, when at least one of the one or more pixel intensity values is within the pixel saturation range, the setting the luminance value of the pixel is based on at least one of: a pixel saturation intensity value; and the at least one of the one or more pixel intensity values. In an embodiment, the setting the luminance value of the pixel based on the pixel saturation intensity value comprises applying a weight to the pixel saturation intensity value. In an embodiment, the image processing circuitry, in operation, when it is determined that the pixel intensity values of the pixel are outside the pixel saturation range, determines whether one or more pixel intensity values of the pixel are within a pixel black-out range; and sets the luminance value of the pixel based on the determination of whether one or more pixel intensity values of the pixel are within the pixel black-out range. In an embodiment, the image processing circuitry, in operation, when it is determined that the pixel intensity values of the pixel are outside the pixel saturation range and outside the pixel black-out range, sets the luminance value of the pixel to a weighted combination of the one or more pixel intensity values of the pixel. In an embodiment, the pixel is a macro-pixel in a Bayer color space and the determined gain is applied to all of the pixels of the macro-pixel.

In an embodiment, a device comprises: means for acquiring digital images; and means for processing digital images, which, in operation: determines whether one or more pixel intensity values of a pixel in a color space are within a pixel saturation range; sets a luminance value of the pixel based on the determination of whether one or more pixel intensity values of the pixel are within the pixel saturation range; determines a pixel gain based on the set luminance value of the pixel; and applies the determined pixel gain to the pixel. In an embodiment, the pixel is one of a plurality of pixels of an input digital image, and the means for processing digital images, in operation, generates an output digital image based on the input digital image, the generating the output digital image including determining and applying respective gains to the plurality of pixels of the input digital image. In an embodiment, when at least one of the one or more pixel intensity values is within the pixel saturation range, the setting the luminance value of the pixel is based on at least one of: a pixel saturation intensity value; and the at least one of the one or more pixel intensity values. In an embodiment, the setting the luminance value of the pixel based on the pixel saturation intensity value comprises applying a weight to the pixel saturation intensity value. In an embodiment, the means for processing digital images, in operation, when it is determined that the pixel intensity values of the pixel are outside the pixel saturation range, determines whether one or more pixel intensity values of the pixel are within a pixel black-out range; and sets the luminance value of the pixel based on the determination of whether one or more pixel intensity values of the pixel are within the pixel black-out range. In an embodiment, the means for processing digital images, in operation, when it is determined that the pixel intensity values of the pixel are outside the pixel saturation range and outside the pixel black-out range, sets the luminance value of the pixel to a weighted combination of the one or more pixel intensity values of the pixel. In an embodiment, the pixel is a macro-pixel in a Bayer color space and the determined gain is applied to all of the pixels of the macro-pixel.

In an embodiment, a system comprises: an image sensor, which, in operation, acquires digital images; and image processing circuitry coupled to the image sensor, wherein the image processing circuitry, in operation: determines whether one or more pixel intensity values of a pixel in a color space are within a pixel saturation range; sets a luminance value of the pixel based on the determination of whether one or more pixel intensity values of the pixel are within the pixel saturation range; determines a pixel gain based on the set luminance value of the pixel; and applies the determined pixel gain to the pixel. In an embodiment, the pixel is one of a plurality of pixels of a digital image acquired by the image sensor, and the image processing circuitry, in operation, generates an output digital image based on the acquired digital image, the generating the output digital image including determining and applying respective gains to the plurality of pixels of the acquired digital image. In an embodiment, when at least one of the one or more pixel intensity values is within the pixel saturation range, the setting the luminance value of the pixel is based on a weight applied to one of: a pixel saturation intensity value; and the at least one of the one or more pixel intensity values.

In an embodiment, a non-transitory computer-readable medium's contents configure image processing circuitry to perform a method, the method comprising: determining whether one or more pixel intensity values of a pixel in a color space are within a pixel saturation range; setting a luminance value of the pixel based on the determination of whether one or more pixel intensity values of the pixel are within the pixel saturation range; determining, using the image processing circuitry, a pixel gain based on the set luminance value of the pixel; and applying, using the image processing circuitry, the determined pixel gain to the pixel. In an embodiment, the contents comprise instructions executable by the image processing circuitry. In an embodiment, the pixel is one of a plurality of macro-pixels of an input digital image and the method comprises generating an output digital image based on the input digital image, the generating the output digital image including determining and applying respective gains to the plurality of macro-pixels of the acquired digital image.

DETAILED DESCRIPTION

Figure 1:
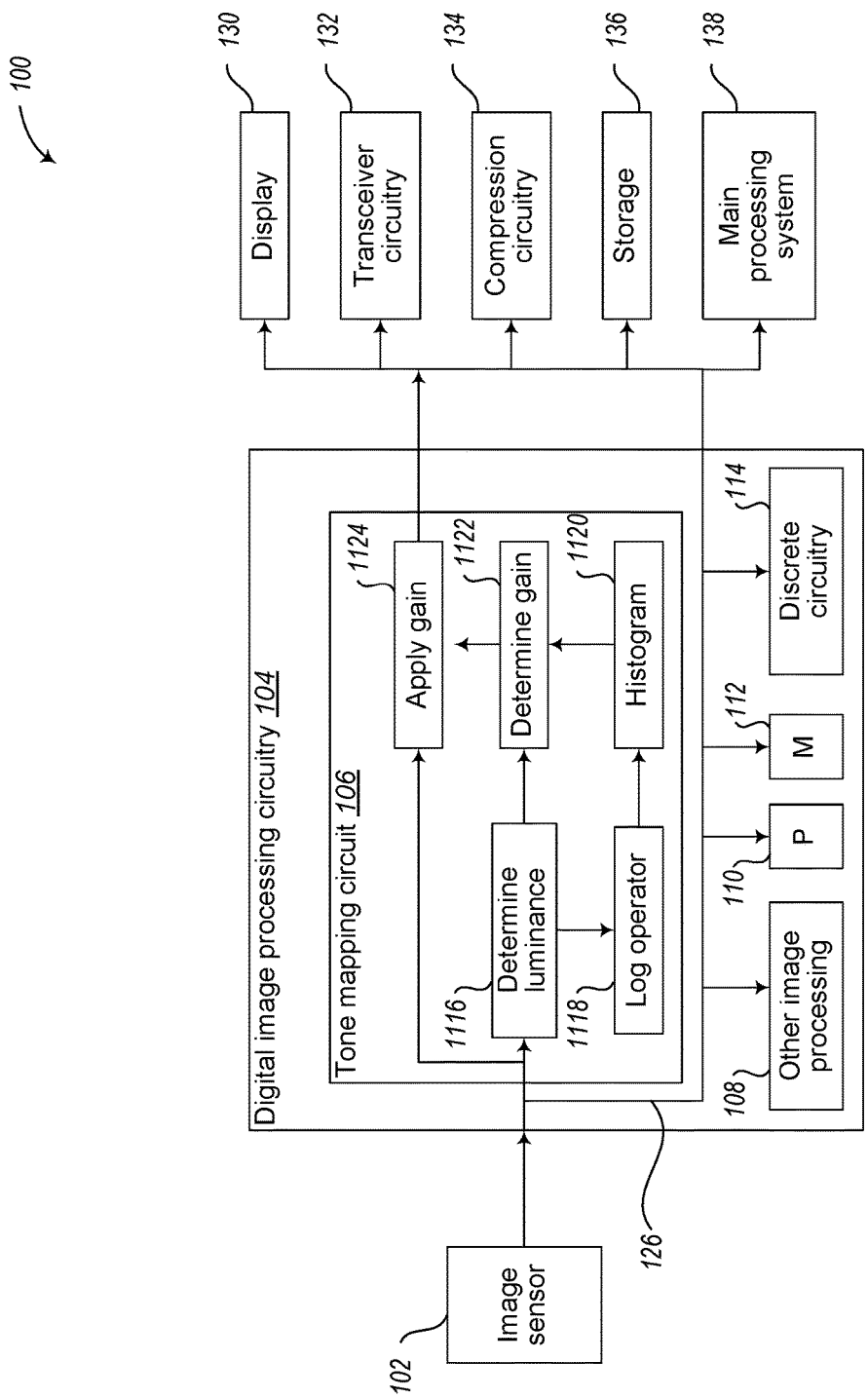
FIG. 1 is a functional block diagram of an embodiment of a tone mapping circuit employing macro-pixel processing.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, image sensors, displays, digital image processing circuitry, etc., such as transistors, integrated circuits, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

FIG. 1 is a functional block diagram of an embodiment of an image processing system 100. As illustrated, the system 100 comprises one or more image sensors 102, digital image processing circuitry 104, and other circuitry, as illustrated a display 130, transceiver circuitry 132, compression circuitry 134, storage 136 and a main processing system 138.

The image sensor 102 may comprise an array of pixels each including a photodetector and an amplifier. The image sensor may be configured to output data (for example, in Bayer format) to be read on a pixel-by-pixel or macro-pixel by macro-pixel basis (e.g., with a sufficient number of output data lines, to output serial data having a sufficient number of bits or words per clock cycle, etc.). Pixels output by the image sensor 102 on a pixel-by-pixel basis may optionally be converted into macro-pixels or macro-blocks, for example using an optional buffering and conversion circuit, etc.

The digital image processing circuitry ISP 104 comprises a tone mapping circuit 106, other image processing circuits 108, one or more processors or processing cores P 110, one or more memories M 112, and discrete circuitry 114.

The tone mapping circuit 106 applies a gain to a pixel based on a pixel luminance, for example, to facilitate reducing the number of bits used to represent pixels of a digital image (the dynamic range). As illustrated, the tone mapping circuit 106 comprises a luminance determining circuit 1116, a log operator circuit 1118, a histogram circuit 1120, a gain determining circuit 1122 and a gain applying circuit 1124. The gain may be applied on a macro pixel by macro pixel basis (e.g., the gain may be applied to a Bayer macro pixel).

The tone mapping circuit 106 receives a pixel (e.g., an individual pixel, a macro pixel) for processing at the luminance determining circuit 1116, and determines a luminance value based on the received pixel. The determined luminance values from the luminance determining circuit 1116 are provided to the log operator circuit 1118 and the gain determining circuit 1122. The log operator circuit 1118 and the histogram circuit 1120 may, for example, generate histogram information based on the received luminance information. The gain determining circuit 1122 receives the determined luminance value and histogram information and determines pixel gains to be applied. The gain determining circuit 1122 may maintain a look-up-table, for example, based on histogram information generated by the histogram circuit 1120, and may use the look-up-table to determine a pixel gain to be applied based on the received luminance value. The look-up-table may be stored in the memory M 112, may be integrated into the gain determining circuit 1122, etc. The gain applying circuit 1124 applies gains to be applied as determined by the gain determining circuit 1122, and applies the determined pixel gains, for example, by multiplying pixel intensity values of an input pixel by the gain to be applied to the pixel.

The system 100 as illustrated comprises a bus system 126 to couple the various components of the system 100 together, and may comprise one or more interfaces, for example to couple the ISP circuitry 104 to other system components. The various components of the system 100 may be used alone or in various combinations to perform the various functions of the system 100. For example, the one or more processors P 110, the one or more memories M 112 and the discrete circuitry DC 114 may be used alone or in various combinations to perform the functions of the tone mapping circuit 106, the other image processing circuitry 108, etc. Although the components of the system 100 are described as separate components for ease of illustration, the components may be combined or separated into additional components in various manners. For example, the compression circuitry 134 may be integrated into the ISP circuitry 104 in some embodiments, the gain determining circuitry 1122 may be integrated into the luminance determining circuitry 1116 in some embodiments, etc.

As mentioned above, the tone mapping gain to be applied to a pixel may be based on a determined luminance value for the pixel. For example, in a Bayer macro pixel having a red intensity value of 255, a green-red intensity value of 50, a blue intensity value of 70, and a green-blue intensity value of 51, a luminance value of the macro pixel may be determined using weighted values of the intensity values of the individual pixels. For example, the following formula may be applied:

$$Y=0.299R+0.587G+0.114B \qquad \text{Equation 1}$$

where Y is the luminance value for the macro pixel, R is the red luminance value, G is an average of the green-red and green-blue luminance values, and B is the blue luminance value. In the example discussed above, Y=113. Because the red intensity value is 255, the red value is saturated. Thus, the use of a luminance value of 113 to determine the tone mapping gain may result in false color in the tone-mapped image. A similar result may occur for an RGB pixel having a red intensity value of 255, a green intensity value of 50, and a blue intensity value of 70, because the red intensity value is 255, although the false color may generally be more visible when tone-mapping is applied on a macro-pixel basis. False color may also occur when intensity values of a pixel approach a saturation value, such as when pixel intensity values approach 255. It is noted that if the gain to be applied based on the luminance value is lower than 1.0 (on saturated information), in the above example, artificial red values may be employed because the result will be a clipped value.

In an embodiment, when any one of the intensity values of a pixel is in a saturation range (e.g., between 240 and 255), a saturation value or a weighted saturation value may be used as the luminance value of the pixel employed to determine the pixel gain instead of a weighted combination of all the intensity values of the pixel. This facilitates avoiding or reducing false color issues in the tone-mapped image.

False color may also arise when any one of the intensity values of a pixel approach a black-out value, such as zero. In an embodiment, when any one of the intensity values of a pixel is in a black-out range (e.g., between 0 and 15), a black-out value, a default value, or a weighted black-out value or weighted default value may be used as the luminance value of the pixel employed to determine the pixel gain instead of a weighted combination of all the intensity values of the pixel. This also facilitates avoiding or reducing false color issues in the tone-mapped image.

Figure 2:
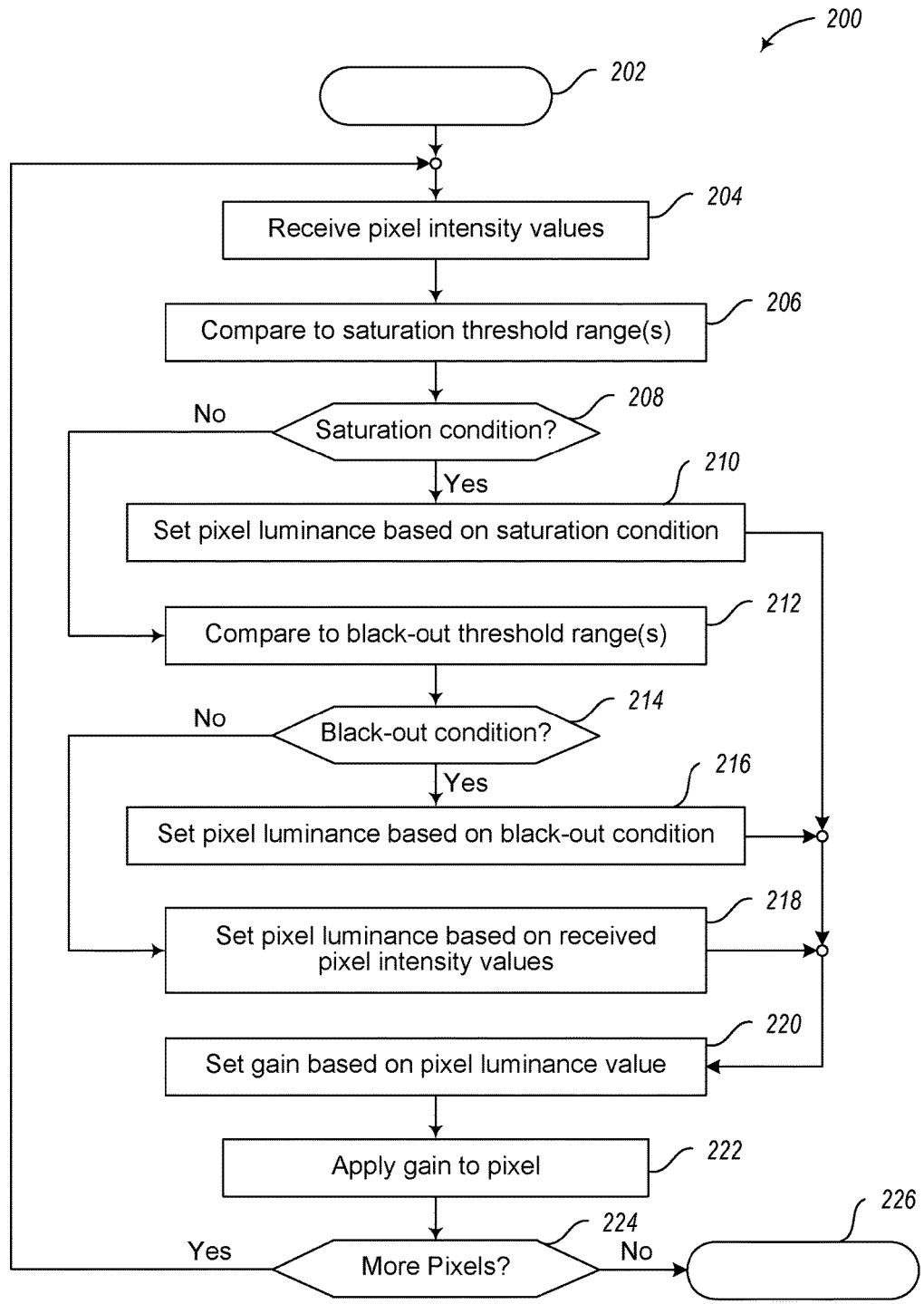
FIG. 2 is a flow diagram of an embodiment of a method of tone mapping a digital image.

FIG. 2 illustrates an embodiment of a method 200 of applying tone mapping to pixels of an image that may be employed, for example, by the embodiment of a system 100 of FIG. 1, and for convenience, the method 200 will be described with respect to system 100 of FIG. 1. Other image processing systems may employ embodiments of the method 200.

The method 200 begins at 202 and proceeds to 204. At 204, the tone mapping circuit 106 receives intensity values of a pixel. For example, the tone mapping circuit 106 may receive a Bayer macro pixel, an RGB pixel, etc. The method proceeds from 204 to 206.

At 206, the tone mapping circuit 106 compares the received intensity values of the pixel to one or more saturation threshold ranges. For example, a single saturation threshold range may be employed (e.g., a saturation range may extend between, for example, intensity values 240 and 255, for each of the intensity values). In some embodiments, multiple saturation threshold ranges may be employed (e.g., a red saturation range may extend between, for example, red intensity values between 230 and 255, a blue saturation range may extend between, for example, blue intensity values between 240 and 255, and a green saturation range may extend between, for example, green intensity values between 250 and 255, etc.). The method 200 proceeds from 206 to 208. The saturation threshold ranges may be determined, for example, using values stored in registers, using look-up-tables, by performing mathematical operations, etc., and various combinations thereof.

At 208, the tone mapping circuit 106 determines whether a saturation condition exists based on the comparisons at 206. For example, if any one of the received intensity values is within the single or respective saturation range, the tone mapping circuit 106 may determine that a saturation condition exists. When it is determined at 208 that a saturation condition exists, the method 200 proceeds from 208 to 210. When it is not determined at 208 that a saturation condition exists, the method 200 proceeds from 208 to 212. The determination of whether a saturation condition exists may, for example, be performed using values stored in registers, using look-up-tables, by performing mathematical operations, etc., and various combinations thereof.

At 210, the tone mapping circuit 106 sets a luminance value for the pixel based on the determination that a saturation condition exists for the pixel. This may be done, for example, by setting the luminance value of the pixel to: the highest of the intensity values of the received pixel; a pixel saturation value; a weighted pixel saturation value; a weighted combination of the pixel intensity values determined to be in a saturation range; etc. The method 200 proceeds from 210 to 220. The luminance value may be set, for example, using values stored in registers, using look-up-tables, by performing mathematical operations, etc., and various combinations thereof.

At 212, the tone mapping circuit 106 compares the received intensity values of the pixel to one or more black-out threshold ranges. For example, a single black-out threshold range may be employed (e.g., a blackout threshold range may extend between, for example, intensity values 0 and 15, for each of the intensity values). In some embodiments, multiple black-out threshold ranges may be employed (e.g., a red black-out threshold range may extend between, for example, red intensity values between 0 and 15, a blue black-out threshold range may extend between, for example, blue intensity values between 0 and 10, and a green black-out threshold range may extend between, for example, green intensity values between 0 and 20, etc.). The method 200 proceeds from 212 to 214. The black-out threshold ranges may be determined, for example, using values stored in registers, using look-up-tables, by performing mathematical operations, etc., and various combinations thereof.

At 214, the tone mapping circuit 106 determines whether a black-out condition exists based on the comparisons at 212. For example, if any one of the received intensity values is within the single or respective black-out threshold ranges, the tone mapping circuit 106 may determine that a black-out condition exists. When it is determined at 214 that a black-out condition exists, the method 200 proceeds from 214 to 216. When it is not determined at 214 that a black-out condition exists, the method 200 proceeds from 214 to 218. The determination of whether a black-out condition exists may, for example, be performed using values stored in registers, using look-up-tables, by performing mathematical operations, etc., and various combinations thereof.

At 216, the tone mapping circuit 106 sets a luminance value for the pixel based on the determination that a black-out condition exists for the pixel. This may be done, for example, by setting the luminance value of the pixel to: the lowest of the intensity values of the received pixel; a pixel black-out value; a weighted pixel black-out value; a weighted combination of the pixel intensity values determined to be in a black-out range; etc. The method 200 proceeds from 216 to 220. The luminance value may be set, for example, using values stored in registers, using look-up-tables, by performing mathematical operations, etc., and various combinations thereof.

At 218, the tone mapping circuit 106 sets a luminance value for the pixel based on the received intensity values for the pixel, for example, by setting the luminance value based on a weighted combination of the received intensity values of the pixel (e.g., in accordance with Equation 1). The method 200 proceeds from 218 to 220. The luminance value may be set, for example, using values stored in registers, using look-up-tables, by performing mathematical operations, etc., and various combinations thereof.

At 220, the tone mapping circuit 106 sets a gain for the pixel based on the set luminance value for the pixel (e.g., the luminance value set at 210, 216, or 218). This may be done, for example, based on the set luminance value for the pixel and histogram information generated by the histogram circuit 1120. A look-up-table, values stored in registers, mathematical operations, etc., and various combinations thereof, may be employed to determine pixel gains to be applied based on the set luminance value. The method 200 proceeds from 220 to 222.

At 222, the tone mapping circuit 106 applies the determined gain to the received intensity values for the pixel. The pixel may be a pixel in an RGB color space, may be a macro-pixel in a Bayer color space, may be a block of pixels in a color space, etc. Application of an embodiment of the method 200 to macro-pixels in a Bayer color space significantly reduced false color issues in the output image. The method 200 proceeds from 222 to 224.

At 224, the tone mapping circuit 106 determines whether there are additional pixels to process. When it is determined at 224 that there are additional pixels to process, the method proceeds from 224 to 204 to process the next pixel. When it is not determined at 224 that there are additional pixels to process, the method proceeds from 224 to 226, where additional processing may be employed, the method may terminate, etc.

Embodiments of the method 200 of FIG. 2 may employ additional acts other than those illustrated, may not perform all of the illustrated acts, and may perform acts in various orders, and various combinations thereof. For example, some embodiments may omit acts 212 through 216; some embodiments may perform acts 206 to 210 after acts 212 to 216; etc.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
determining, using image processing circuitry, whether one or more pixel intensity values of a pixel in a color space are within a pixel saturation range, wherein the pixel is one of a plurality of pixels of an input digital image;
setting, using the image processing circuitry, a luminance value of the pixel based on the determination of whether one or more pixel intensity values of the pixel are within the pixel saturation range;
determining, using the image processing circuitry, a pixel gain based on the set luminance value of the pixel;
applying, using the image processing circuitry, the determined pixel gain to the pixel; and
generating, using the image processing circuitry, an output digital image based on the input digital image, the generating the output digital image including determining and applying respective gains to the plurality of pixels of the input digital image, wherein when at least one of the one or more pixel intensity values is within the pixel saturation range, the setting the luminance value of the pixel is based on at least one of:
a pixel saturation intensity value; and
the at least one of the one or more pixel intensity values, wherein the setting the luminance value of the pixel based on the pixel saturation intensity value comprises applying a weight to the pixel saturation intensity value.

2. The method of claim 1 wherein luminance values of pixels of the output digital image are coded over a smaller number of bits than luminance values of pixels of the input digital image.

3. The method of claim 1, comprising:
when it is determined that the pixel intensity values of the pixel are outside the pixel saturation range, determining whether one or more pixel intensity values of the pixel are within a pixel black-out range; and
setting the luminance value of the pixel based on the determination of whether one or more pixel intensity values of the pixel are within the pixel black-out range.

4. The method of claim 3 wherein when it is determined that one or more of the pixel intensity values are within the pixel black-out range, the setting the luminance value of the pixel comprises applying a weight to a black-out intensity value.

5. The method of claim 3, comprising:
when it is determined that the pixel intensity values of the pixel are outside the pixel saturation range and outside the pixel black-out range, setting the luminance value of the pixel to a weighted combination of the one or more pixel intensity values of the pixel.

6. The method of claim 1 wherein the pixel is a macro-pixel and the determined gain is applied to all of the pixels of the macro-pixel.

7. The method of claim 1 wherein the color space is a Bayer color space.

8. A method, comprising:
determining, using image processing circuitry, whether one or more pixel intensity values of a pixel in a color space are within a pixel saturation range, wherein the pixel is one of a plurality of pixels of an input digital image;
setting, using the image processing circuitry, a luminance value of the pixel based on the determination of whether one or more pixel intensity values of the pixel are within the pixel saturation range, wherein when it is determined that the pixel intensity values of the pixel are outside the pixel saturation range, the luminance value of the pixel is set to a weighted combination of the one or more pixel intensity values;
determining, using the image processing circuitry, a pixel gain based on the set luminance value of the pixel;
applying, using the image processing circuitry, the determined pixel gain to the pixel; and
generating, using the image processing circuitry, an output digital image based on the input digital image, the generating the output digital image including determining and applying respective gains to the plurality of pixels of the input digital image.

9. The method of claim 8 wherein when at least one of the one or more pixel intensity values is within the pixel saturation range, the setting the luminance value of the pixel is based on at least one of:
a pixel saturation intensity value; and
the at least one of the one or more pixel intensity values.

10. The method of claim 9 wherein the setting the luminance value of the pixel based on the pixel saturation intensity value comprises applying a weight to the pixel saturation intensity value.

11. The method of claim 10, comprising determining the weight based on a difference between the at least one of the one or more pixel intensity values and the pixel saturation intensity value.

12. A device, comprising:
a memory; and
image processing circuitry, which, in operation:
determines whether one or more pixel intensity values of a pixel in a color space are within a pixel saturation range;
sets a luminance value of the pixel based on the determination of whether one or more pixel intensity values of the pixel are within the pixel saturation range;
determines a pixel gain based on the set luminance value of the pixel; and
applies the determined pixel gain to the pixel, wherein the pixel is one of a plurality of pixels of an input digital image, and the image processing circuitry, in operation, generates an output digital image based on the input digital image, the generating the output digital image including determining and applying respective gains to the plurality of pixels of the input digital image, wherein when at least one of the one or more pixel intensity values is within the pixel saturation range, the setting the luminance value of the pixel is based on at least one of:
 a pixel saturation intensity value; and
 the at least one of the one or more pixel intensity values, and wherein the setting the luminance value of the pixel based on the pixel saturation intensity value comprises applying a weight to the pixel saturation intensity value.

13. The device of claim 12 wherein the image processing circuitry, in operation,
 when it is determined that the pixel intensity values of the pixel are outside the pixel saturation range, determines whether one or more pixel intensity values of the pixel are within a pixel black-out range; and
 sets the luminance value of the pixel based on the determination of whether one or more pixel intensity values of the pixel are within the pixel black-out range.

14. The device of claim 13 wherein the image processing circuitry, in operation,
 when it is determined that the pixel intensity values of the pixel are outside the pixel saturation range and outside the pixel black-out range, sets the luminance value of the pixel to a weighted combination of the one or more pixel intensity values of the pixel.

15. The device of claim 12 wherein the pixel is a macro-pixel in a Bayer color space and the determined gain is applied to all of the pixels of the macro-pixel.

16. A system, comprising:
 an image sensor, which, in operation, acquires digital images; and
 image processing circuitry coupled to the image sensor, wherein the image processing circuitry, in operation:
  determines whether one or more pixel intensity values of a pixel in a color space are within a pixel saturation range;
  sets a luminance value of the pixel based on the determination of whether one or more pixel intensity values of the pixel are within the pixel saturation range;
  determines a pixel gain based on the set luminance value of the pixel; and
  applies the determined pixel gain to the pixel,
 wherein the pixel is one of a plurality of pixels of a digital image acquired by the image sensor, and the image processing circuitry, in operation, generates an output digital image based on the acquired digital image, the generating the output digital image including determining and applying respective gains to the plurality of pixels of the acquired digital image, and
 when at least one of the one or more pixel intensity values is within the pixel saturation range, the setting the luminance value of the pixel is based on a weight applied to one of:
  a pixel saturation intensity value; and
  the at least one of the one or more pixel intensity values.

17. A non-transitory computer-readable medium having executable instructions which configure image processing circuitry to perform a method, the method comprising:
 determining whether one or more pixel intensity values of a pixel in a color space are within a pixel saturation range;
 setting a luminance value of the pixel based on the determination of whether one or more pixel intensity values of the pixel are within the pixel saturation range;
 determining, using the image processing circuitry, a pixel gain based on the set luminance value of the pixel; and
 applying, using the image processing circuitry, the determined pixel gain to the pixel,
 wherein the pixel is one of a plurality of macro-pixels of an input digital image and the method comprises generating an output digital image based on the input digital image, the generating the output digital image including determining and applying respective gains to the plurality of macro-pixels of the input digital image, and
 when at least one of the one or more pixel intensity values is within the pixel saturation range, the setting the luminance value of the pixel is based on a weight applied to one of:
  a pixel saturation intensity value; and
  the at least one of the one or more pixel intensity values.

* * * * *